United States Patent
Hollingsworth et al.

(10) Patent No.: US 6,231,477 B1
(45) Date of Patent: May 15, 2001

(54) APPARATUS AND METHOD FOR PROVIDING AUTOMATIC SHIFT MODES IN AN AUTOMATIC TRANSMISSION

(75) Inventors: Rita D. Hollingsworth, Ortonville; John M. Rzepecki, II, Clinton Township; Scott A. Miller, Rochester Hills; Edward W. Czarnecki, Shelby Township, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/316,605

(22) Filed: May 21, 1999

(51) Int. Cl.[7] .................................................. B60K 41/06
(52) U.S. Cl. ........................................... 477/107; 477/155
(58) Field of Search ....................... 74/335, 336; 701/52, 701/55; 477/155, 107

(56) References Cited

U.S. PATENT DOCUMENTS

| | | | |
|---|---|---|---|
| 4,565,267 | * | 1/1986 | Nishikawa et al. ............... 192/3.31 |
| 4,875,391 | | 10/1989 | Leising et al. ........................ 74/866 |
| 4,984,484 | * | 1/1991 | Fujiwara et al. ................... 477/115 |
| 5,125,486 | * | 6/1992 | Murata ............................... 192/3.26 |
| 5,224,398 | * | 7/1993 | Sasaki ............................ 477/143 X |
| 5,269,204 | * | 12/1993 | Moroto et al. ..................... 477/115 |
| 5,393,275 | * | 2/1995 | Okada et al. ..................... 701/52 X |
| 5,396,420 | * | 3/1995 | Graf ................................. 701/57 X |
| 5,425,686 | * | 6/1995 | Grange ............................ 74/335 X |
| 5,509,322 | | 4/1996 | Anderson et al. .................... 74/335 |
| 5,620,393 | * | 4/1997 | Minowa et al. .................... 477/155 |
| 5,680,307 | | 10/1997 | Issa et al. ...................... 364/424.081 |
| 5,683,327 | * | 11/1997 | Inuzuka et al. ................. 477/174 X |
| 5,722,292 | | 3/1998 | Anderson et al. .................... 74/335 |
| 5,767,769 | | 6/1998 | Issa ..................................... 340/456 |
| 5,885,187 | * | 3/1999 | Tabata ................................ 477/107 |
| 6,006,151 | * | 12/1999 | Graf ..................................... 701/57 |
| 6,035,735 | * | 3/2000 | Graf et al. ............................ 74/335 |

FOREIGN PATENT DOCUMENTS

| | | | |
|---|---|---|---|
| 4233938 | * | 10/1992 | (DE) . |
| 11-22500 | * | 1/1999 | (JP) . |

OTHER PUBLICATIONS

1. "S–M–O–O–O–O–T–H: Saturn automatic combines technology and cost saving" article, one page, Automotive News, Oct. 15, 1992.
2. "Driving With Dedra—Lancia's new four-speed electronic transmission—the Dedra 2.0 i.e." article, p. 105, Automotive Industries, Sep. 1992.

* cited by examiner

*Primary Examiner*—Sherry Estremsky
(74) *Attorney, Agent, or Firm*—Larry Schurupoff

(57) ABSTRACT

A method and apparatus for providing first and second automatic shift modes for an automatic transmission. Shifting of the automatic transmission is controlled by a transmission controller. The driver selects a control mode by manipulating an input device. The controller controls the operation of the automatic transmission using a first set of operating characteristics and a second set of operating characteristics in response to receiving the first mode signal and the second mode signals, wherein the first and second sets of operating characteristics include engine management characteristics.

34 Claims, 8 Drawing Sheets

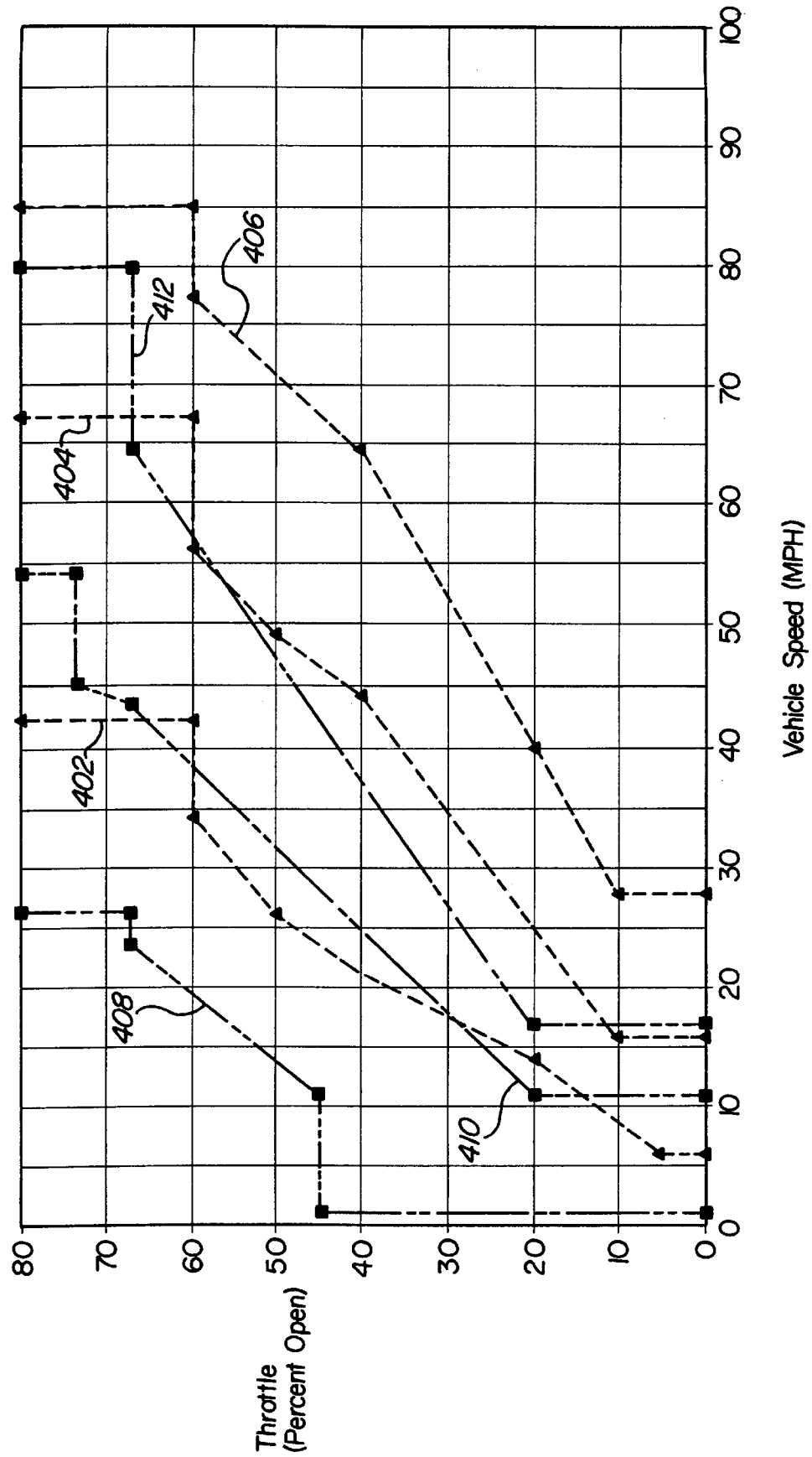

APPARATUS AND METHOD FOR PROVIDING AUTOMATIC SHIFT MODES IN AN AUTOMATIC TRANSMISSION

I. FIELD OF THE INVENTION

The present invention relates generally to an apparatus and method for providing an automatic transmission, and more particularly, to an apparatus and method for providing an apparatus and method for changing the operating characteristics of an automatic transmission.

II. BACKGROUND ART

Automotive vehicles require a power train to transmit the force of an engine to the wheels of the vehicle. The power train's main component is typically referred to as the transmission. The transmission converts engine speed and torque in accordance with the tractive-power demand of the vehicle. Transmissions are generally, either manually or automatically actuated. Manual transmissions generally include mechanical mechanisms for coupling rotating gears to produce different ratio outputs to drive the wheels. Automatic transmissions are designed to take automatic control of the frictional units, gear ratio selection and gear shifting.

Vehicles equipped with automatic transmissions are generally easier to operate with a gear selection process generally adapted to favor fuel economy and smooth shifts. However, some drivers may favor the more aggressive performance and feel of a manual transmission in exchange for lower fuel economy.

The present invention is aimed at overcoming one or more of the problems as set forth above.

III. SUMMARY OF THE INVENTION

In one aspect of the present invention, an apparatus for providing first and second automatic shift modes for an automatic transmission is provided. The apparatus includes an input device adapted to produce one of a first and second mode signals in response to manipulation by a driver. A plurality of sensors is coupled to the automatic transmission. The sensors sense a plurality of parameters related to the automatic transmission and produce a plurality of respective sensor signals. A controller is coupled to the automatic transmission and the input device. The controller is adapted to receive the sensor signals and the one of the first and second mode signals and automatically shift the automatic transmission in response to the sensor signals and the one of the first and second mode signals. The controller is programmed to provide first and second sets of operating characteristics for automatic operation of the automatic transmission in response to receiving the first and second mode signals, respectively. The first and second sets of operating characteristics include engine management characteristics.

In another aspect of the present invention, a method for providing first and second automatic shift modes for an automatic transmission is provided. The method includes the steps of receiving one of a first and second mode signals in response to selection by a driver and sensing a plurality of parameters related to the automatic transmission and producing a plurality of respective sensor signals. The method further includes the step of receiving the sensor signals and the one of the first and second mode signals, automatically shifting the automatic transmission as a function of the sensor signals and a first set of operating characteristics in response to receiving the first mode signal and a second set of operating characteristics in response to receiving the second mode signals. The first and second sets of operating characteristics include engine management characteristics.

IV. BRIEF DESCRIPTION OF THE DRAWINGS

FIG. 4 is an exemplary graph of a shift schedule for an automatic transmission in a first automatic mode, according to an embodiment of the present invention;

V. DETAILED DESCRIPTION OF THE PREFERRED EMBODIMENT

With reference to the drawings, and in operation, the present provides an apparatus 102 and method for providing first and second automatic shift modes for an automatic transmission.

A. Operation of the Automatic Transmission—Overview

Figure 1:
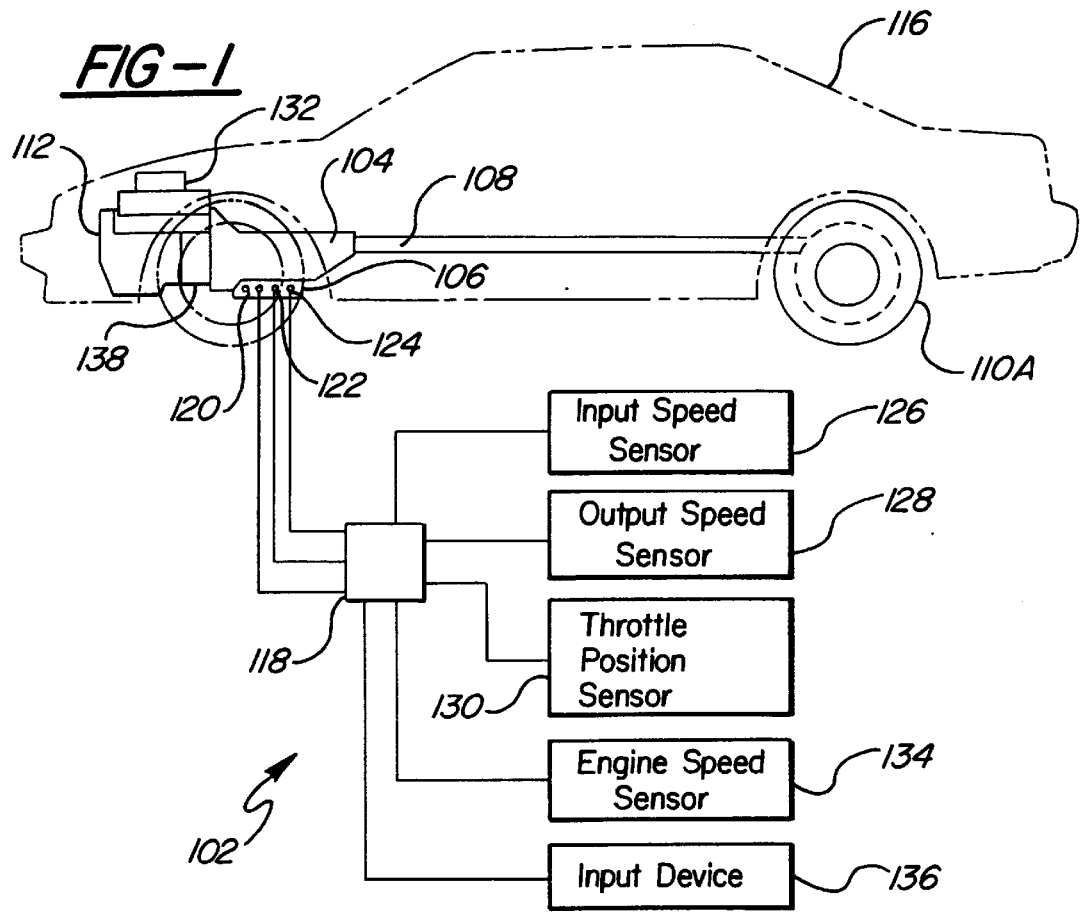
FIG. 1 is a diagrammatic view of a vehicle with an automatic transmission and an apparatus for manually controlling the automatic transmission, according to an embodiment of the present invention.

With specific reference to FIG. 1, the automatic transmission 104 is shown having a valve body 106 and an output shaft 108. The automatic transmission 104 provides a gearing interface between two driven wheels 110A, 110B (only one of which are shown) and an internal combustion engine 112 to adjust the torque and speed provided to output shaft 108 from the internal combustion engine 112.

The automatic transmission 104 can select between four or five gear ratios, three or four forward gear ratios and one reverse gear ratio, for providing the optimum gear ratio between the output shaft 108 and the internal combustion engine 112. To change from one gear ratio to another, the valve body 106 hydraulically communicates with a plurality of bands, gears, and clutches (not shown) to cause clamping thereof around various portions of planetary gear sets (not shown) within the automatic transmission 104.

This clamping and unclamping regulates the rotation of the planetary gear sets which, in turn, selects a specific gear ratio for automatic transmission 104. The output shaft 108 is coupled to the driven wheels 110A, 110B through a differential 114 to drive the vehicle 116.

Referring to FIG. 1, a controller or electronic control module 118 electrically communicates with valves 120, 122, 124 of valve body 106 to actuate various combinations of bands and clutches to adjust the gear ratio as discussed above.

The controller 118 includes a processor. The term processor is meant to include microcomputers, microprocessors, integrated circuits, etc . . . all of which are capable of being programmed. The controller 118 is adapted to receive input signals from various sensors and input devices and to responsively control the automatic transmission 112.

Each valve 120, 122, 124 is operated by an electronically controlled solenoid (not shown) which is actuated by the controller 118 to apply or remove hydraulic pressure to specific bands or clutches, thereby adjusting the gear ratio of automatic transmission 104.

To determine the proper gear ratio for automatic transmission 104, the controller 118 must analyze a number of factors which include the current gear ratio of automatic transmission 104, speed of vehicle 118 (as a function of the transmission output speed), throttle position and engine speed, i.e., input speed of the automatic transmission 104.

A plurality of sensors are coupled to the automatic transmission 104 and are adapted to sense a plurality of parameters related to the automatic transmission 104 and produce a plurality of respective sensor signals. In the preferred embodiment, the plurality of sensors includes an input speed sensor 126, an output speed sensor 128, a throttle position sensor 130, and an engine speed sensor 132.

The input speed sensor 126 determines the rotational input speed of the automatic transmission 104. Likewise, the output speed sensor 128 provides an input to controller 118 representative of the velocity at which the vehicle 116 is traveling. To determine the present gear ratio in which the automatic transmission 104 is operating, the input speed sensor 126 is compared to the output speed sensor 128. The ratio of these sensors is determinative of the gear ratio of automatic transmission 104.

The throttle position sensor 130 detects the amount of opening of a throttle blade 132. Lastly, the engine speed sensor 132 determines the revolutions per minute in which internal combustion engine 112 is turning.

The current gear ratio of the automatic transmission 104 is determined by the controller 118 and is a function of a selected position of an input device 136 and the measured parameters.

Figure 2:
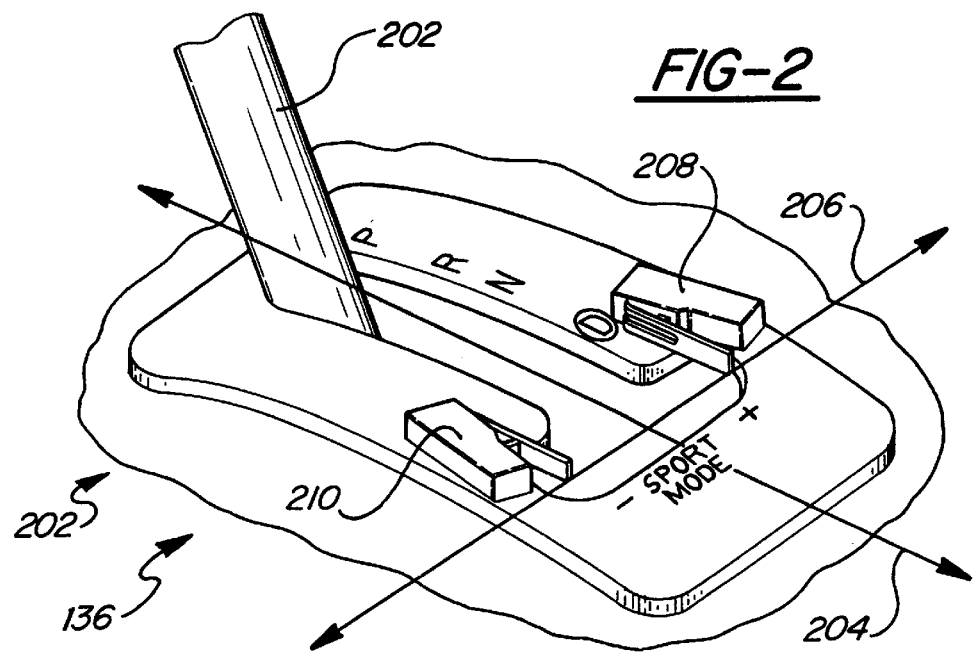
FIG. 2 is a diagrammatic view of an input device for manually shifting the automatic transmission of FIG. 1.

With reference to FIG. 2, in the preferred embodiment the input device 136 includes a gear shift lever 202. Typically, the gear shift lever 202 has a number of positions, for example, park, overdrive, one or more low gear positions (not shown), neutral and reverse. As shown, the gear shift lever 202 is movable along a first axis 204 to select one of the transmission modes.

The low gear positions limit the gear ratio, to one of the lower gears, e.g., second or third. The reverse position places the transmission in the reverse gear.

When the gear shift lever 202 is in the overdrive position the automatic transmission 104 and the controller 118 are selected to be in a first automatic mode, i.e., overdrive. In the first automatic mode, the controller 118 selects one of the forward gears based on vehicle parameters and a set of shift schedules (usually stored in lookup tables). Generally, the automatic transmission is designed to maximize fuel economy and provide smooth shifts while in the first automatic mode.

The above described automatic transmission and variations and modifications thereof are well known in the art. As such, the skilled artisan will appreciate that the present invention may be used with any of these modifications or variations and is not limited to the automatic transmission described herein.

B. Operation of the Automatic Transmission in First and Second Automatic Modes

1. Overview

As stated above, the first automatic mode of operation is aimed at maximizing fuel economy. However, an operator may desire a more "aggressive" feel and performance driven transmission. The present invention provides a more aggressive operation via a second automatic mode.

In the preferred embodiment, the driver selects one of the first and second modes via the input device 136. As discussed below, the input device includes a first mode position and a second mode position. When the driver places the input device 136 in the first mode position or the second mode position, a respective first mode signal or second mode signal is produced.

As in the first automatic mode, in the second automatic mode the transmission controller 118 selects one of the forward gears based on vehicle parameters and a set of shift schedules (usually stored in lookup tables). To achieve the desired performance characteristics in the transmission, the present invention modifies operation of the transmission using one or more of the methods discussed below.

Figure 3:
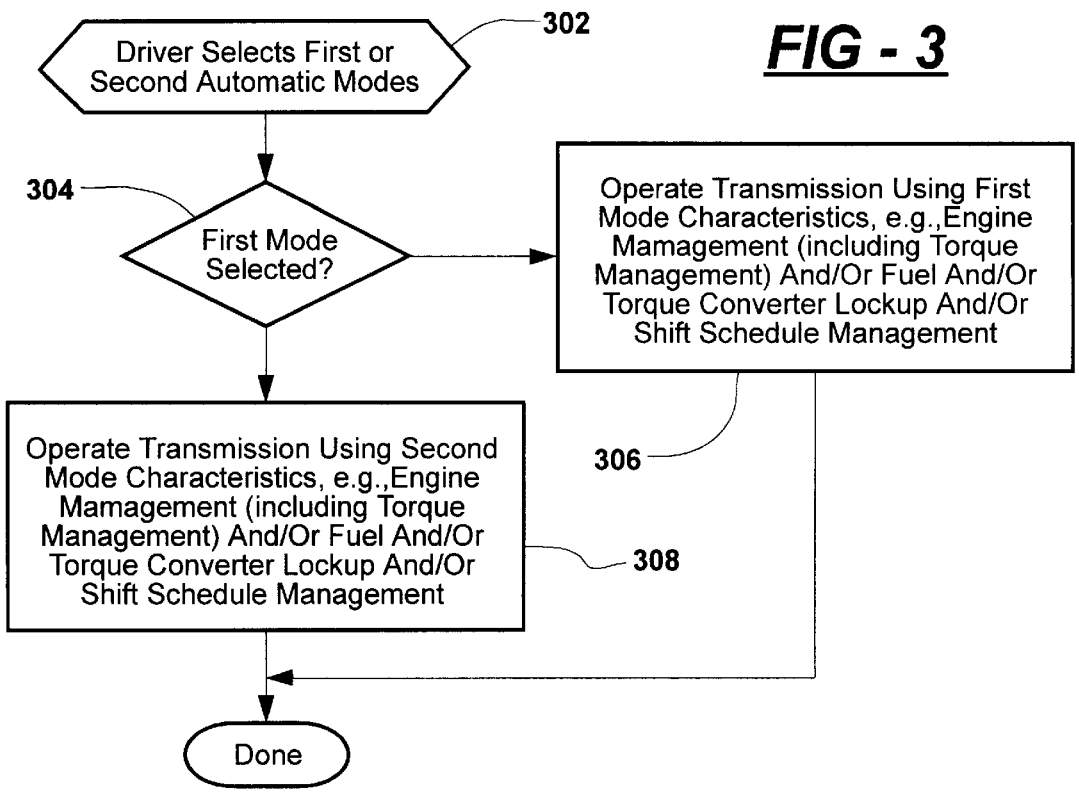
FIG. 3 is a flow diagram showing operation of an automatic transmission with first and second modes of operation, according to an embodiment of the present invention.

With reference to FIG. 3, the general operation of the present invention in accordance with an embodiment of the present invention will now be described. In a first control block 302, the driver selects one of the first or second automatic control modes. In a first decision block 304, if the first mode was selected by the driver then control proceeds to a second control block 306. Otherwise control proceeds to a third control block 308.

In the second control block 306, the automatic transmission 104 is controlled automatically using a set of first mode or operating characteristics (see below). In the third control block 308, the automatic transmission 104 is controlled automatically using a set of second mode or operating characteristics (see below).

As described above, the controller 118 is coupled to the automatic transmission 104 and the input device 136 and is adapted to receive the signals from the sensors 126, 128, 130, 132 and the first mode signal or second mode signal produced by the input device 136. The controller 118 automatically shifts the automatic transmission 104 in response to the sensor signals and the received mode signal. The controller 118 is programmed to provide a first set of operating characteristics in response to receiving the first mode signal and to provide a second set of operating characteristics in response to receiving the second mode signal.

2. Transmission Shifting Using Shift Schedules

With reference to FIG. 4, operation of an exemplary automatic transmission in the first automatic mode is illustrated with respect to a shift schedule. The transmission controller 118 uses the shift schedule to determine if and when a shifting of the transmission 104 should occur based on the vehicle speed and the position of the throttle.

The line segments 402, 404, 406 represent transmission upshifts from the first gear ratio to the second gear ratio, from the second gear ratio to the third gear ratio, and from the third gear ratio to the fourth gear ratio, respectively. For example, if vehicle speed and throttle position are to the left of dashed line 402, then the automatic transmission is in first gear. If vehicle speed and throttle position are to the right of line segment 402 then the automatic transmission is in second gear. As vehicle speed and throttle position cross line segment 402 (from upper left to bottom right), the transmission controller 118 commands a shifting of the automatic transmission from first gear to second gear.

Similarly, line segments lines 408, 410, 412 represent transmission downshifts from the second gear ratio to the first gear ratio, from the third gear ratio to the second gear ratio and from the fourth gear ratio to the third gear ratio, respectively.

In the preferred embodiment, the shift schedules are implemented using look up tables.

Figure 5:
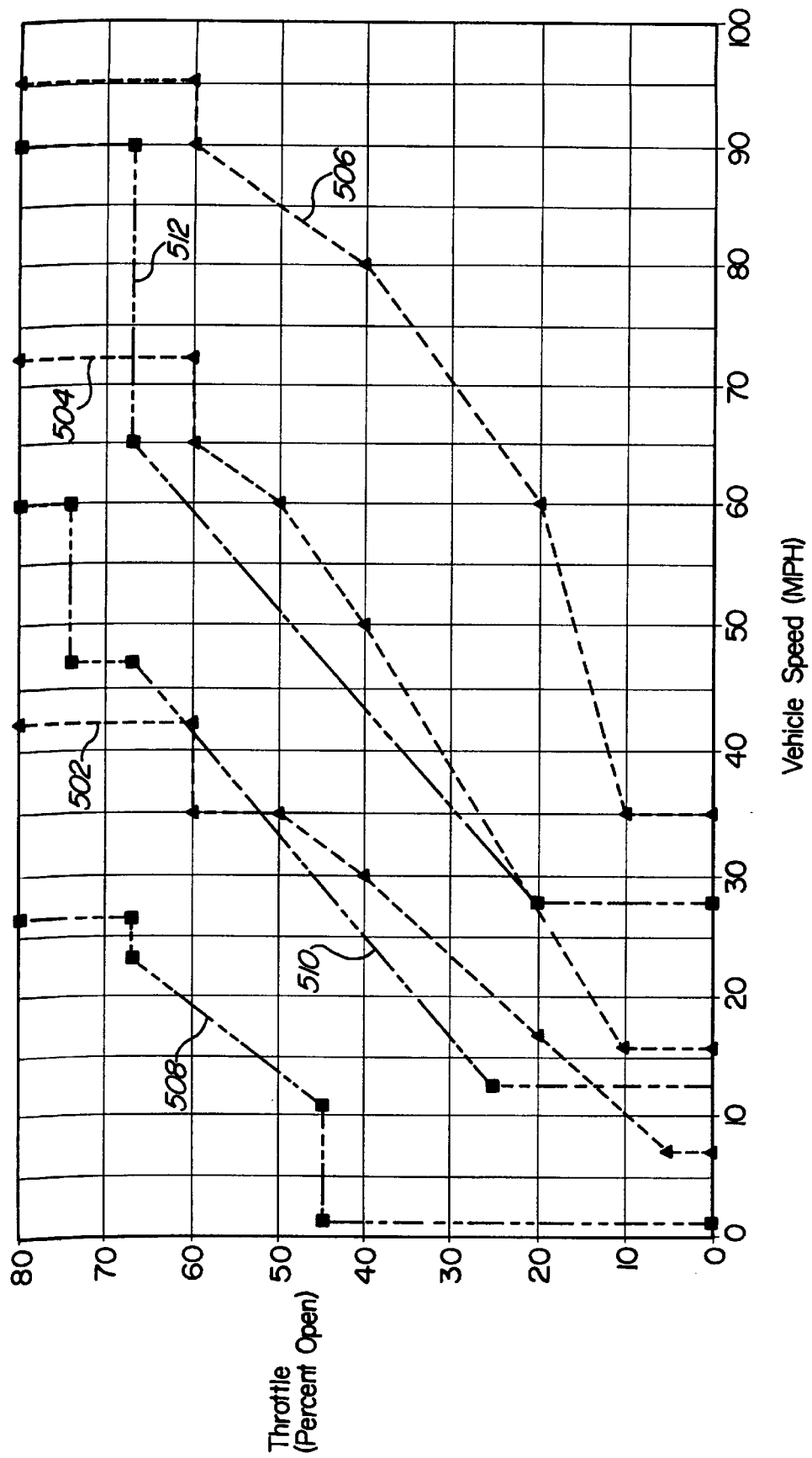
FIG. 5 is an exemplary graph of a shift schedule for an automatic transmission in a second automatic mode, according to an embodiment of the present invention.

With reference to FIG. 5, the shift schedules may be adjusted to achieve a more performance feel to the shifting while in the second automatic mode. As shown, portions of one or more of the upshift line segments 502, 504, 506 may be shifted to the right (along the X axis) and/or down (along the Y axis) with respect to line segments 402, 404, 406. During upshifting this has the effect of delaying the shift to a higher gear ratio. In other words, the lower gear ratio is maintained longer, supplying more torque and thus greater acceleration.

Additionally, portions of one or more of the downshift segments 508, 510, 512 may be shifted to the right and/or down, as shown. This has the effect of allowing a kickdown earlier and allowing a lower gear ratio at a higher speed.

3. The Hold in Gear Function

When the vehicle 116 is traveling at a relatively high rate of speed and constant velocity, the transmission controller 118 senses engine speed and throttle position and places the automatic transmission 104 in a high gear ratio, i.e., third or fourth gear, producing a high speed and low torque at the wheels. If the driver desires to rapidly accelerate, such as in passing another vehicle, the driver moves the throttle to a substantially open or wide open position. Under these conditions, the transmission controller 118 senses the changed throttle position and shifts the automatic transmission to a lower gear ratio, producing more torque at the wheels and greater acceleration. When the throttle is reduced, the controller 118 shifts the automatic transmission back to a higher gear ratio.

However, there are some situations when it is desirable to "hold" the gear in the lower gear ratio. For example, when the driver is passing another vehicle, the driver will accelerate and the automatic transmission will downshift to a lower gear ratio, as described above. Typically, the driver will pass the other vehicle, reduce throttle, to check the vehicle's position and then accelerate again. When the throttle is reduced, the transmission controller 118 will attempt to shift the automatic transmission 104 back into the higher gear ratio (based on the shift schedule). When the throttle is thereafter increased, the automatic transmission will downshift again to provide acceleration. Since this occurs in a short period of time, the controller 118 produces an undesirable downshift, upshift, downshift combination resulting in "jerky" operation.

In this situation it is desirable to delay shifting of the automatic transmission into the higher gear ratio for a period of time (for example, 0.5 seconds) in order to eliminate the undesired upshift.

Figure 6:
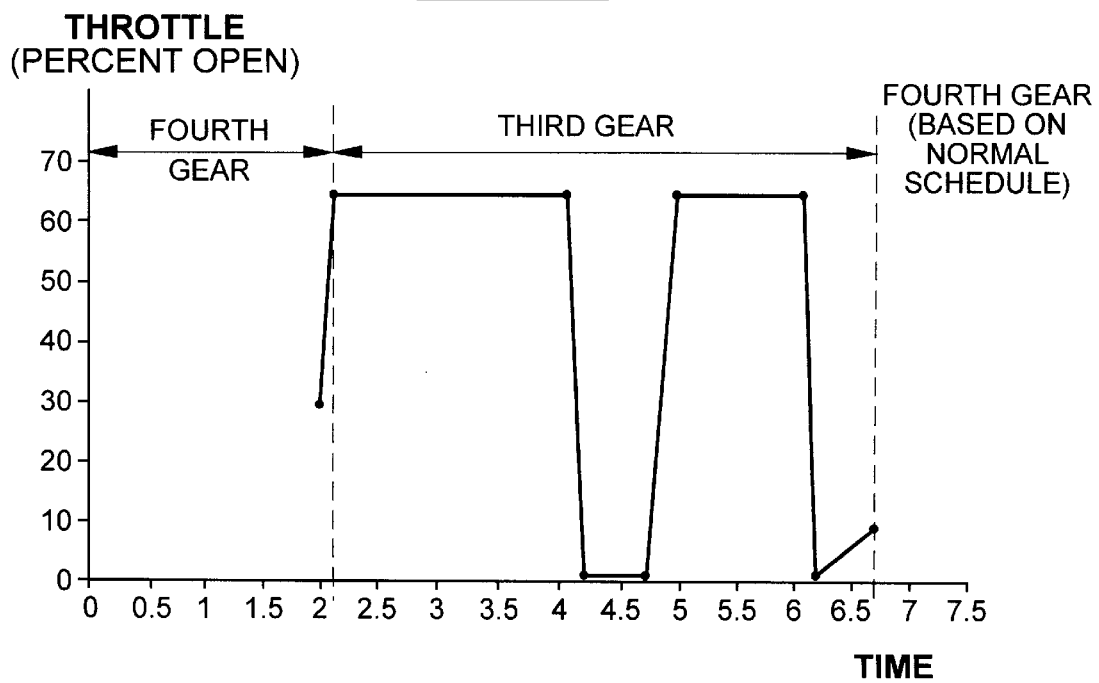
FIG. 6 is an exemplary graph illustrating operation of a hold in gear function of an automatic transmission, according to an embodiment of the present invention.

With reference to FIG. 6, a driving scenario using the Hold in Gear function is described. The vehicle 116 begins at time 0 traveling at a relatively high speed with the throttle position about 30 percent until time=2 seconds. At 2 seconds, the vehicle driver rapidly depresses the gas pedal and opens the throttle to approximately 65 percent. The speed of the vehicle 116 and throttle position causes the controller 118 to downshift the automatic transmission 106 into third gear. At time=4 seconds, the vehicle driver takes his foot off the gas pedal, thereby causing the opening of the throttle to be reduced to 1 percent at time=4.2. At time=4.7 seconds, the driver opens the throttle again to 65 percents. At time=6 seconds, the driver begins to open the throttle.

As discussed previously, based on the normal shift schedules the controller 118 would normally instruct the automatic transmission 104 to upshift back into fourth gear. However, the Hold in Gear function causes the controller 118 to delay upshifting of the automatic transmission 106. As such, the automatic transmission 106 remains in third gear until time=6.7 seconds, at which point the controller 118 allows the automatic transmission 106 to resume its normal shift pattern.

This "hold-in-gear" function is disclosed in commonly owned U.S. Patent Application, entitled "Method and Apparatus for Controlling Upshift on an Automatic Transmission", U.S. application Ser. No. 09/283,456 filed on Apr. 1, 1999, by Rita D. Hollingsworth, Colt R. Correa, and Scott A. Miller, which is hereby incorporated by reference.

In one embodiment, the Hold in Gear feature is disabled in the first automatic mode and enabled in the second automatic mode.

In another embodiment, the detection threshold, i.e., tip-out, for enabling the hold in gear function feature is modified. Tip-out occurs when the throttle is quickly released from a substantially open position to a substantially closed position. A tip-out condition is detected when the rate of decrease in the throttle position exceeds a predetermined threshold. In the another embodiment, the threshold is adjusted. Preferably, $TH_{FIRST\_AUTOMATIC\_MODE}$ is greater than $TH_{SECOND\_AUTOMATIC\_MODE}$, where $TH_{FIRST\_AUTOMATIC\_MODE}$ is the threshold used in the first automatic mode and $TH_{SECOND\_AUTOMATIC\_MODE}$ is the threshold used in the second automatic mode.

4. Torque Converter Lock-up Schedule

A torque converter 138 selectively couples the engine 112 and the automatic transmission 104. The transmission controller 118 is adapted to lockup the converter 138 under certain conditions. Typically the conditions are defined in terms of throttle position and vehicle speed. With the torque converter 138 locked, engine efficiency is increased, but less torque is available at the driven wheels 110A, 110B.

Figure 7:
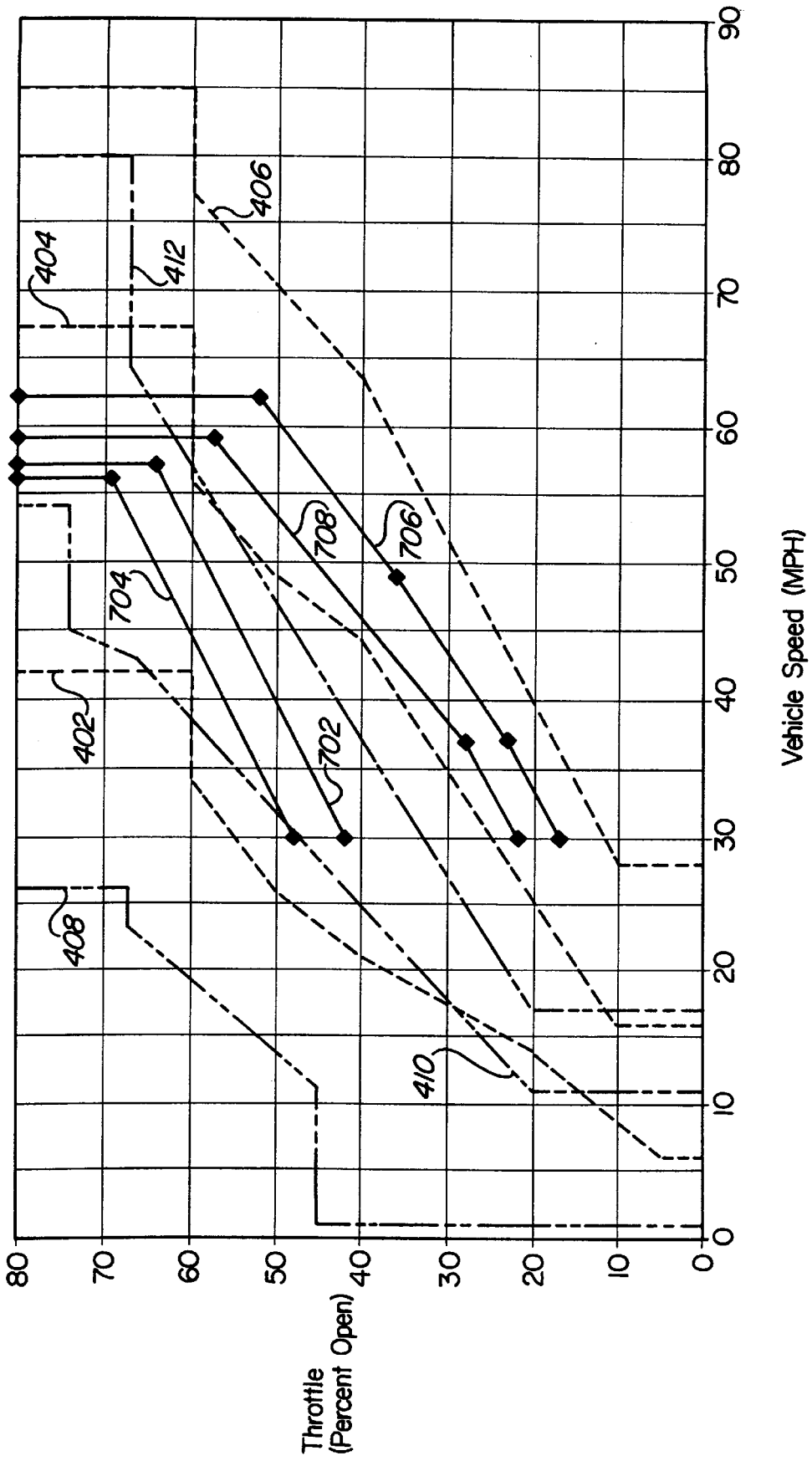
FIG. 7 is an exemplary graph illustrating torque converter lock-up in a first automatic mode, according to an embodiment of the present invention.

With reference to FIG. 7, operation of the automatic transmission 104 and the torque converter lock-up feature in the first automatic mode will now be discussed.

Typically, the torque converter 138 will not be allowed to lock when the vehicle 116 is traveling below a predefined speed, for example, 30 miles per hour (MPH).

The first automatic mode third gear lockup trace 702 and the first automatic mode third gear unlock trace 704 represent the locking and unlocking of the torque converter while the automatic transmission 104 is in the third gear ratio.

With the automatic transmission 104 in third gear, when throttle position and vehicle speed cross the first automatic mode third gear lockup trace 702 (from upper left to lower right), the transmission controller 118 locks the torque converter 138.

With the automatic transmission 104 in third gear, when the throttle position and vehicle speed cross the first automatic mode third gear unlock trace 704 (from lower right to upper left), the transmission controller 118 unlocks the torque converter 138.

Likewise, first automatic mode fourth gear lock and unlock traces 706, 708 represent the locking and unlocking of the torque converter 138 while the automatic transmission 104 is in the fourth gear ratio.

With the automatic transmission 104 in the fourth gear, when throttle position and vehicle speed cross the first automatic mode fourth gear lock trace 606 (from upper left to lower right), the transmission controller 118 locks the torque converter 138.

With the automatic transmission 104 in the fourth gear, when the throttle position and vehicle speed cross the first automatic mode fourth gear unlock trace 708 (from right to left), the transmission controller 118 unlocks the torque converter.

Figure 8:
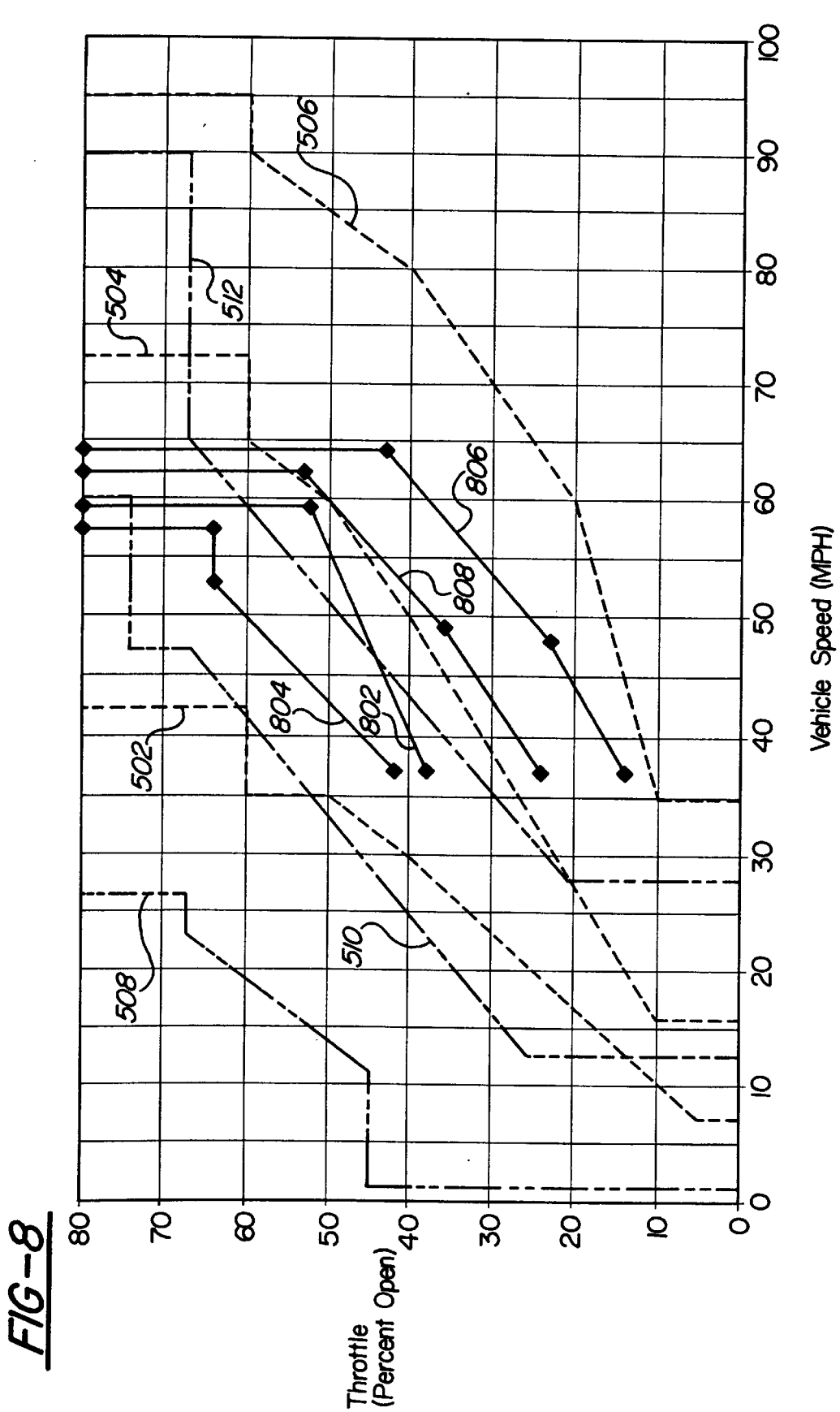
FIG. 8 is an exemplary graph illustrating torque converter lock-up in the second automatic mode, according to an embodiment of the present invention.

With reference to FIG. 8, operation of the automatic transmission 104 and the torque converter lock-up feature in the second automatic mode will now be discussed. In order to provide a more aggressive feel, torque converter lock-up will be delayed. First, the vehicle speed threshold is raised, i.e., the torque converter will not be locked until a higher vehicle speed is obtained, e.g., 37 MPH.

Additionally, portions of one or more of the torque converter lock and unlock traces 802, 804, 806, 808 may be shifted up and to the right (with respect to traces 702, 704, 706, 708).

5. Shifting the Transmission to a Lower Gear Ratio

Figure 9:
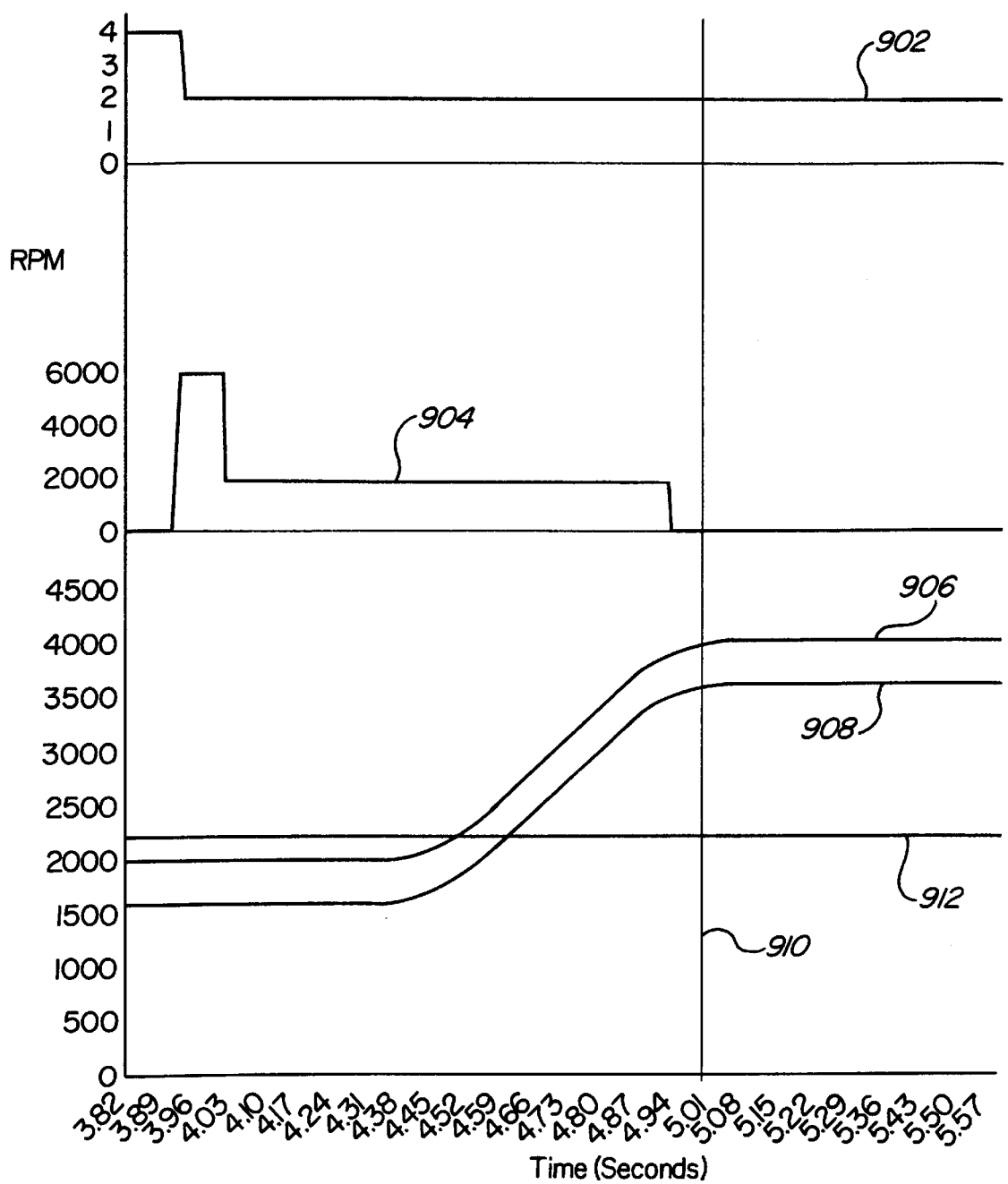
FIG. 9 is an exemplary graph illustrating a kickdown operation of an automatic transmission in a first automatic mode, according to an embodiment of the present invention; and, FIG. 10 is an exemplary graph illustrating a kickdown operation of an automatic transmission in the second automatic mode, according to an embodiment of the present invention.

With reference to FIG. 9, operation of the automatic transmission 104 and the controller 118 in the first automatic mode is illustrated during a kickdown operation.

First, the controller determines that a down shift is required (based on vehicle speed and throttle position using the shift schedule). The trace 902 represents the output of the shift schedule, i.e., the call for a kickdown to change the gear ratio. In order to accomplish the downshift, the controller 118 sets a desired output acceleration (trace 904) of the transmission. The desired output acceleration is used to determine how quickly the clutches should engage and reach the new gear ratio.

Transmission output speed and transmission input (torque converter turbine) speed increase (traces 906, 908, respectively). When the transmission controller 118 calls for a kickdown, the controller 118 actuates the appropriate valves 120, 122, 124 to release and engage the clutches needed to shift the automatic transmission 104. Once the correct gear ratio is achieved (transmission output speed vs. transmission input speed), the controller 118 completely engages the clutches. As shown in FIG. 9, the clutches are fully engaged and the desired gear ratio is achieved at approximately 5.02 seconds (line segment 910).

The valves are electronically controlled to provide hydraulic fluid to the clutches. Engagement of a clutch has two phases. First, the clutch must be filled with hydraulic fluid. Once filled, the clutch will begin to engage as additional fluid flow is provided until it is fully engaged. The rate of fluid flow during each of these phases controls the rate and "feel" of the shifting operation. As stated above, in the first automatic mode control of the shifting of the automatic transmission 104 down to a lower gear is designed for a smooth shift.

Figure 10:
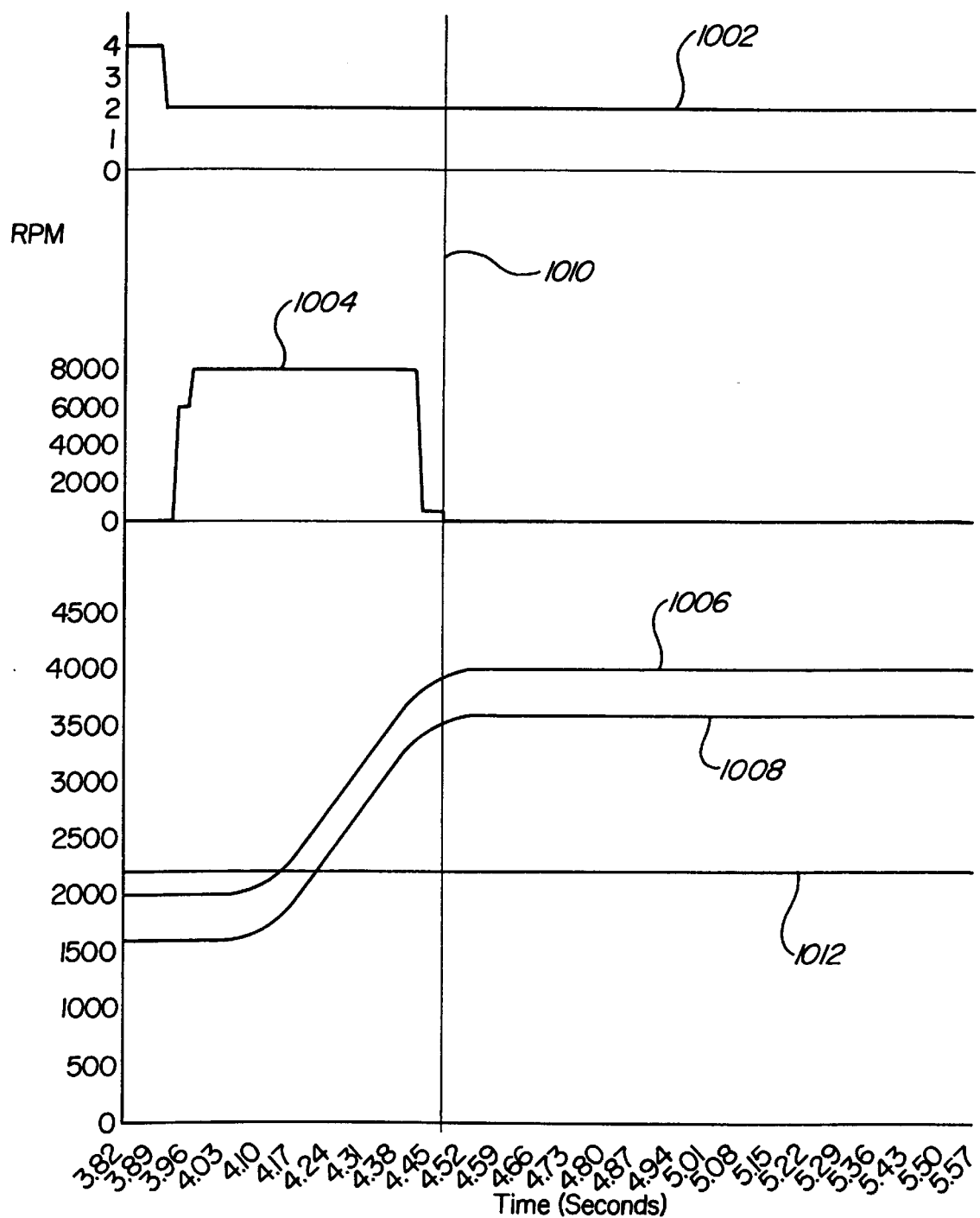

With reference to FIG. 10, operation of the automatic transmission 104 and the controller 118 in the second automatic mode is illustrated during a kickdown operation.

First, the controller determines that a kickdown is required (based on vehicle speed and throttle position using the shift schedule). Trace 1002 represents the output of the shift schedule. In order to accomplish the kickdown, the controller 118 sets a desired output acceleration (trace 1004) of the transmission.

When the shift schedule demands a kickdown, electronically controlled solenoids (not shown) begin to actuate the appropriate valves 120, 122, 124 to release and engage the clutches needed to shift the automatic transmission 104.

Transmission input speed and transmission output (torque converter turbine) speed increase (traces 1006, 2008, respectively). Once the output and input speeds reach the desired gear ratio, the shift is completed by fully engaging the correct clutches. torque converter output speed) is achieved, the controller 118 actuates the appropriate valves 120, 122, 124 to release and engage the clutches needed to shift the transmission 104. As shown in FIG. 10, the clutches are fully engaged and the desired gear ratio is achieved at approximately 4.52 seconds (line segment 1010).

The rate of fluid flow during each of the phases of clutch engagement controls the rate and "feel" of the shifting operation. In the second automatic mode, the kickdown is made more aggressive by providing crisper, quicker downshift times by modifying the rate at which the respective clutches are filled and engaged. This is accomplished by modifying the hydraulic fluid flow rate through the corresponding valves 120, 122, 124. For example, as shown in FIG. 9 the downshift occurs approximately 0.5 seconds quicker in the second automatic mode than the first automatic mode.

6. Engine Management

The controller 118 is coupled to an engine controller (not shown) to provide information relative to its control of the engine 112. The engine controller controls the engine based on the information received from the transmission controller 118 to reduce wear on the transmission.

During a shift operation, energy is absorbed by the clutches until the new gear ratio is achieved. The applying clutch slips at a rate determined by the controller 118 while the releasing clutch is still engaged. This assists in providing a smooth shift operation. However, high input power during the slip and apply portions creates excessive wear on the clutch elements.

In the preferred embodiment, the engine controller is adapted for controlling, inter alia, electronically controlled fuel injectors which provide fuel to the engine. During a shifting operation, the engine controller reduces the power input to the automatic transmission 104. This is known as torque management. Torque management may be performed by reducing the amount of fuel supplied to the engine, e.g., turning off one or more fuel injectors during the shifting operation.

Additionally, when the vehicle is decelerating and throttle position is closed or substantially closed, one or more of the injectors may be turned off for a predetermined period of time. In this situation, the engine 112 will be driven by the wheels 110 via the transmission and will assist in slowing the vehicle 116.

The transmission controller 118 performs torque management by instructing the engine controller to reduce the power input to the transmission 104.

In the second automatic mode, a more aggressive torque management scheme is used. In other words, the amount of fuel supplied to the engine is reduced, but to a lesser extent than in the first mode.

In the preferred embodiment, torque management is performed by instructing the engine controller to turn off a specified number of fuel injectors. In the second automatic mode, the engine controller is instructed to leave on more injectors than in the first automatic mode.

Additionally, when the vehicle is decelerating and throttle position is closed or substantially closed, the fuel supplied to the engine may also be reduced by turning off one or more of the injectors for a predetermined period of time. In this situation, the engine 112 will be driven by the wheels 110 via the automatic transmission and will assist in slowing the vehicle 116. In the second automatic mode, this type of engine management may also be more aggressive, i.e., closing or reducing the fuel supplied to the engine more quickly or to a greater extent.

7. Selection of One of the First and Second Automatic Modes.

Selection of the first automatic mode is performed by placing the gear shift lever in the overdrive position (the circled "D") in a conventional manner.

In the illustrated embodiment, the present invention is provided in conjunction with an apparatus for manually shifting the automatic transmission. (see below). As shown in FIG. 2, the input device 136 is provided with a "+" and a "–" position which are used by the driver to indicate a desired upshift or downshift, respectively. In the preferred embodiment, to place the apparatus 102 in the second automatic mode the gear shift lever is pulled past the overdrive position. If the gear shift lever 202 is placed in this position, the controller 118 automatically controls the automatic transmission 104 in accordance with the second automatic mode as described above. In another embodiment, the second automatic mode of the automatic transmission is selected by placing the gear shift lever in the first automatic mode position, i.e., overdrive, and actuating an additional switch or pushbutton (not shown).

C. Manual Operation of the Automatic Transmission

The controller 118 is coupled to the automatic transmission 104 and to the input device 134. The driver of the vehicle 116 manipulates the gear shift lever 202 to operate the automatic transmission in the automatic modes and to manually operate the automatic transmission 104 and to select the manual mode (see below).

With reference to FIG. 2, in the preferred embodiment the input device 134 is integral with a gear shift lever 202. The gear shift lever 202 is operable along a first linear axis 204 for operation of the automatic transmission in its automatic modes in the conventional manner.

The gear shift lever 202 is also operable along a transverse linear axis 206. Operation of the gear shift lever 202 along the transverse linear axis 206 enters directs the controller 118 to manually control the automatic transmission 104.

In the manual mode, the current gear of the automatic transmission 104 is chosen by the user through operation of the gear shift lever 202 along the transverse axis 206. Movement of the gear shift lever 202 along the transverse axis 206 towards the "+" will direct the controller 118 to shift the automatic transmission 104 to the next gear. Movement of the gear shift lever 202 along the transverse axis 206 towards the "–" will direct the controller 118 to (down) shift the automatic transmission 104 to the previous gear. Movement of the gear shift lever 202 along the transverse axis 206 triggers first and second switches 208, 210 which transmit respective signals to the controller 118.

Operation of an automatic transmission in a manual mode using a gear shift lever is disclosed in U.S. Pat. No. 5,680,307 issued to Nabil M. Issa et al on Oct. 21, 1997, which is herein incorporated by reference.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An apparatus, comprising:

an automatic transmission;

an input device including a gear shift lever, responsive to manipulation by a driver and adapted to produce one of a first and second mode signals in response thereto;

a plurality of sensors coupled to the automatic transmission and adapted to sense a plurality of parameters related to the automatic transmission and produce a plurality of respective sensor signals; and, a controller coupled to the automatic transmission and the input device, and being adapted to receive the sensor signals and the one of the first and second mode signals and automatically shift the automatic transmission in response to the sensor signals and the one of the first and second mode signals, the controller being programmable to provide first and second modes for automatic operation of the automatic transmission in response to receiving the first and second mode signals, respectively, such that torque management is performed in the first mode by reducing the amount of fuel supplied to the engine during a shift operation and torque management is performed in the second mode by reducing the amount of fuel supplied to the engine during a shift operation to a lesser extent than in the first mode.

2. An apparatus, as set forth in claim 1, wherein the input device includes a first mode position and a second mode position and wherein the input device produces the first mode signal in response to being in the first mode position and produces the second mode signal in response to being in the second mode position.

3. An apparatus, as set forth in claim 1 wherein the controller commands changes in the gear ratio of the automatic transmission by utilizing shift schedules.

4. An apparatus, as set forth in claim 1, wherein the controller commands changes in the gear ratio of the automatic transmission while in the first mode by utilizing a first shift schedule and commands changes in the gear ratio of the automatic transmission while in the second mode by utilizing a second shift schedule.

5. An apparatus, as set forth in claim 1, including a torque converter and an engine and wherein the engine, transmission, and the torque converter are in a vehicle, wherein the controller is adapted to lock the torque converter when the automatic transmission is in a high gear ratio and vehicle speed is above a predetermined threshold according to a torque converter lockup schedule.

6. An apparatus, as set forth in claim 1, including a torque converter and an engine and wherein the engine, transmission, and the torque converter are in a vehicle, wherein the controller is adapted to lock the torque converter when the automatic transmission is in a high gear ratio and vehicle speed is above a predetermined threshold according to first and second torque converter lockup schedules while in the first and second modes, respectively.

7. An apparatus, comprising:

an automatic transmission;

an engine coupled to the automatic transmission, an input device responsive to manipulation by a driver and adapted to produce one of a first and second mode signals in response thereto:

a plurality of sensors coupled to the automatic transmission and adapted to sense a plurality of parameters related to the automatic transmission and produce a plurality of respective sensor signals; and, a controller coupled to the automatic transmission and the input device, and being adapted to receive the sensor signals and the one of the first and second mode signals and automatically shift the automatic transmission in response to the sensor signals and the one of the first and second mode signals, the controller being programmable to provide first and second sets of operating characteristics for automatic operation of the automatic transmission in response to receiving the first and second mode signals, respectively, wherein the first and second sets of operating characteristics include torque management and wherein torque management is performed in the first mode by reducing the amount of fuel supplied to the engine during a shift operation and torque management is performed in the second mode by reducing the amount of fuel supplied to the engine during a shift operation to a lesser extent than in the first mode.

8. An apparatus, as set forth in claim 7, wherein the input device includes a first mode position and a second mode position and wherein the input device produces the first mode signal in response to being in the first mode position and produces the second mode signal in response to being in the second mode position.

9. An apparatus, as set forth in claim 8, wherein the input device includes a gear shift lever.

10. An apparatus, as set forth in claim 7, wherein the controller commands changes in the gear ratio of the automatic transmission by utilizing shift schedules.

11. An apparatus, as set forth in claim 7, wherein the controller commands changes in the gear ratio of the automatic transmission while in the first mode by utilizing a first shift schedule and commands changes in the gear ratio of the automatic transmission while in the second mode by utilizing a second shift schedule.

12. An apparatus, as set forth in claim 7, including a torque converter and an engine and wherein the engine, transmission, and the torque converter are in a vehicle, wherein the controller is adapted to lock the torque converter when the automatic transmission is in a high gear ratio and vehicle speed is above a predetermined threshold according to a torque converter lockup schedule.

13. An apparatus, as set forth in claim 7, including a torque converter and an engine and wherein the engine, transmission, and the torque converter are in a vehicle, wherein the controller is adapted to lock the torque converter when the automatic transmission is in a high gear ratio and vehicle speed is above a predetermined threshold according to first and second torque converter lockup schedules while in the first and second modes, respectively.

14. An apparatus, comprising:

an automatic transmission;

an engine coupled to the automatic transmission and wherein the engine and automatic transmission are in a vehicle;

an input device responsive to manipulation by a driver and adapted to produce one of a first and second mode signals in response thereto;

a plurality of sensors coupled to the automatic transmission and adapted to sense a plurality of parameters related to the automatic transmission and produce a plurality of respective sensor signals; and, a controller coupled to the automatic transmission and the input device, and being adapted to receive the sensor signals and the one of the first and second mode signals and automatically shift the automatic transmission in response to the sensor signals and the one of the first and second mode signals. the controller being programmable to provide first and second sets of operating characteristics for automatic operation of the automatic transmission in response to receiving the first and second mode signals, respectively, wherein the first and second sets of operating characteristics includes torque management performed in the first mode of operation by reducing the amount of fuel supplied to the engine while the vehicle is decelerating and torque management performed in the second mode by reducing the amount of fuel supplied to the engine to a lesser extent than in the first mode while the vehicle is decelerating.

15. An apparatus, as set forth in claim 14, wherein the input device includes a first mode position and a second mode position and wherein the input device produces the first mode signal in response to being in the first mode position and produces the second mode signal in response to being in the second mode position.

16. An apparatus, as set forth in claim 15, wherein the input device includes a gear shift lever.

17. An apparatus, as set forth in claim 14, wherein the controller commands changes in the gear ratio of the automatic transmission by utilizing shift schedules.

18. An apparatus, as set forth in claim 14, wherein the controller commands changes in the gear ratio of the automatic transmission while in the first mode by utilizing a first shift schedule and commands changes in the gear ratio of the automatic transmission while in the second mode by utilizing a second shift schedule.

19. An apparatus, as set forth in claim 14, including a torque converter and wherein the engine, transmission, and the torque converter are in a vehicle, wherein the controller is adapted to lock the torque converter when the automatic transmission is in a high gear ratio and vehicle speed is above a predetermined threshold according to a torque converter lockup schedule.

20. An apparatus, as set forth in claim 14, including a torque converter and wherein the engine, transmission, and the torque converter are in a vehicle, wherein the controller is adapted to lock the torque converter when the automatic transmission is in a high gear ratio and vehicle speed is above a predetermined threshold according to first and second torque converter lockup schedules while in the first and second modes, respectively.

21. An apparatus, comprising a throttle;

an automatic transmission;

an input device responsive to manipulation by a driver and adapted to produce one of first and second mode signals in response thereto;

a plurality of sensors coupled to the automatic transmission and adapted to sense a plurality of parameters related to the automatic transmission and produce a plurality of respective sensor signals; and wherein the plurality of sensors includes a throttle position sensor adapted to produce a responsive throttle position signal; and a controller coupled to the automatic transmission and the input device, and being adapted to receive the sensor signals and the one of the first and second mode signals and automatically shift the automatic transmission in response to the sensor signals and the one of the first and second mode signals, the controller being programmable to provide first and second sets of operating characteristics for automatic operation of the automatic transmission in response to receiving the first and second mode signals, respectively, wherein the first and second sets of operating characteristics include engine management characteristics; wherein the controller is adapted to receive the throttle position signal, detect a tip-out condition as a function of the throttle position signal and responsively prevent a shifting of the automatic transmission to a higher gear ratio for a predetermined period of time.

22. An apparatus, as set forth in claim 21, wherein the input device includes a first mode position and a second mode position and wherein the input device produces the first mode signal in response to being in the first mode position and produces the second mode signal in response to being in the second mode position.

23. An apparatus, as set forth in claim 22, wherein the input device includes a gear shift lever.

24. An apparatus, as set forth in claim 21, wherein the controller commands changes in the gear ratio of the automatic transmission by utilizing shift schedules.

25. An apparatus, as set forth in claim 21, wherein the controller commands changes in the gear ratio of the automatic transmission while in the first mode by utilizing a first shift schedule and commands changes in the gear ratio of the automatic transmission while in the second mode by utilizing a second shift schedule.

26. An apparatus, as set forth in claim 21, including a torque converter and an engine and wherein the engine, transmission, and the torque converter are in a vehicle, wherein the controller is adapted to lock the torque converter when the automatic transmission is in a high gear ratio and vehicle speed is above a predetermined threshold according to a torque converter lockup schedule.

27. An apparatus, as set forth in claim 21, including a torque converter and an engine and wherein the engine, transmission, and the torque converter are in a vehicle, wherein the controller is adapted to lock the torque converter when the automatic transmission is in a high gear ratio and vehicle speed is above a predetermined threshold according to first and second torque converter lockup schedules while in the first and second modes, respectively.

28. A method for providing first and second automatic shift modes for an automatic transmission coupled to an engine, including the steps of:
  receiving one of a first and second mode signals in response to selection by a driver;
  sensing a plurality of parameters related to the automatic transmission and producing a plurality of respective sensor signals; and,
  receiving the sensor signals and the one of the first and second mode signals automatically shifting the automatic transmission as a function of the sensor signals and a first set of operating characteristics in response to receiving the first mode signal and a second set of operating characteristics in response to receiving the second mode signals, wherein the first and second sets of operating characteristics include engine management characteristics, wherein the step of automatically shifting the automatic transmission includes the steps of reducing the amount of fuel supplied to the engine during a shift operation in the first mode and reducing the amount of fuel supplied to the engine during a shift operation to a lesser extent than in the first mode while in the second mode.

29. A method, as set forth in claim 28, wherein the controller commands changes in the gear ratio of the automatic transmission by utilizing shift schedules.

30. A method, as set forth in claim 28, wherein the step of automatically shifting the automatic transmission includes the steps of:
  a. determining a desired gear ratio while in the first mode by utilizing a first shift schedule, and
  b. determining a desired gear ratio while in the second mode by utilizing a second shift schedule.

31. A method, as set forth in claim 28, wherein the automatic transmission is coupled to a torque converter and an engine and wherein the engine, transmission, and the torque converter are in a vehicle, wherein the step of automatically shifting the automatic transmission includes the step of locking the torque converter when the automatic transmission is in a high gear ratio and vehicle speed is above a predetermined threshold according to a torque converter lockup schedule.

32. A method, as set forth in claim 28, wherein the automatic transmission is coupled to a torque converter and an engine and wherein the engine, transmission, and the torque converter are in a vehicle, wherein the step of automatically shifting the automatic transmission includes the steps of
  a. while in the first mode, locking the torque converter when the automatic transmission is in a high gear ratio and vehicle speed is above a predetermined threshold according to first torque converter lockup schedule, and
  b. while in the second mode, locking the torque converter when the automatic transmission is in a high gear ratio and vehicle speed is above a second predetermined threshold according to a second torque converter lockup schedule.

33. A method for providing first and second automatic shift modes for an automatic transmission coupled to an engine, including the steps of:
  receiving one of a first and second mode signals in response to selection by a driver;
  sensing a plurality of parameters related to the automatic transmission and producing a plurality of respective sensor signals; and,
  receiving the sensor signals and the one of the first and second mode signals automatically shifting the automatic transmission as a function of the sensor signals and a first set of operating characteristics in response to receiving the first mode signal and a second set of operating characteristics in response to receiving the second mode signals, wherein the first and second sets of operating characteristics include engine management characteristics;
  in the first mode, reducing the amount of fuel supplied to the engine while the vehicle is decelerating, and
  in the second mode, reducing the amount of fuel supplied to the engine to a lesser extent than in the first mode while the vehicle is decelerating.

34. A method for providing first and second automatic shift modes for an automatic transmission and a throttle coupled to the automatic transmission, including the steps of:
  receiving one of a first and second mode signals in response to selection by a driver;
  sensing a plurality of parameters related to the automatic transmission and producing a plurality of respective sensor signals and wherein the plurality of sensor signals includes a throttle position signal; and,
  receiving the sensor signals and the one of the first and second mode signals automatically shifting the automatic transmission as a function of the sensor signals and a first set of operating characteristics in response to receiving the first mode signal and a second set of operating characteristics in response to receiving the second mode signals, wherein the first and second sets of operating characteristics include engine management characteristics, and detecting a tip-in condition as a function of the throttle position signal and responsively preventing a shifting of the automatic transmission to a higher gear ratio for a predetermined period of time.

* * * * *